(12) United States Patent
Temming

(10) Patent No.: US 9,202,349 B2
(45) Date of Patent: Dec. 1, 2015

(54) LIGHT SIGNAL DEVICE AND METHOD FOR ASCERTAINING THE DEGREE OF SOILING OF A SHUTTER DISK FOR A SIGNAL GENERATOR

(76) Inventor: Rudolf Temming, Koenigslutter (DE)

( * ) Notice: Subject to any disclaimer, the term of this patent is extended or adjusted under 35 U.S.C. 154(b) by 0 days.

(21) Appl. No.: 14/118,617

(22) PCT Filed: May 10, 2012

(86) PCT No.: PCT/EP2012/058624
§ 371 (c)(1),
(2), (4) Date: Nov. 19, 2013

(87) PCT Pub. No.: WO2012/156270
PCT Pub. Date: Nov. 22, 2012

(65) Prior Publication Data
US 2014/0104072 A1    Apr. 17, 2014

(30) Foreign Application Priority Data
May 19, 2011    (DE) .......................... 10 2011 076 123

(51) Int. Cl.
| G08B 5/22 | (2006.01) |
| G08B 5/36 | (2006.01) |
| B61L 5/18 | (2006.01) |
| G08B 29/10 | (2006.01) |
| G02B 1/00 | (2006.01) |

(52) U.S. Cl.
CPC ................. *G08B 5/36* (2013.01); *B61L 5/1881* (2013.01); *G08B 29/10* (2013.01); *G02B 1/00* (2013.01); *G02B 2207/00* (2013.01)

(58) Field of Classification Search
CPC ............................... G02B 1/00; G02B 2207/00
See application file for complete search history.

(56) References Cited

U.S. PATENT DOCUMENTS

| 3,947,131 | A | * | 3/1976 | Karl ............................... 356/445 |
| 4,348,673 | A | * | 9/1982 | Richardson ............. 340/870.18 |
| 8,436,748 | B2 | | 5/2013 | Mimeault et al. |
| 2001/0035492 | A1 | * | 11/2001 | Estevez-Garcia ............. 250/221 |
| 2009/0256911 | A1 | * | 10/2009 | Hakki et al. ................... 348/149 |

FOREIGN PATENT DOCUMENTS

| DE | 102004035438 A1 | 2/2006 |
| DE | 102011076123 A1 | 11/2012 |
| WO | 2008154737 A1 | 12/2008 |

* cited by examiner

*Primary Examiner* — Shirley Lu
(74) *Attorney, Agent, or Firm* — Laurence Greenberg; Werner Stemer; Ralph Locher

(57) ABSTRACT

A light signal device includes at least one light sensor and a signal generator which has a light source and a shutter disk. An inner side of a screening stop, which protects the shutter disk, holds at least one reflector element which reflects a portion of the light emitted by the light source in the direction of the at least one light sensor. A method for ascertaining the degree of soiling of a shutter disk for a signal generator is also provided.

14 Claims, 1 Drawing Sheet

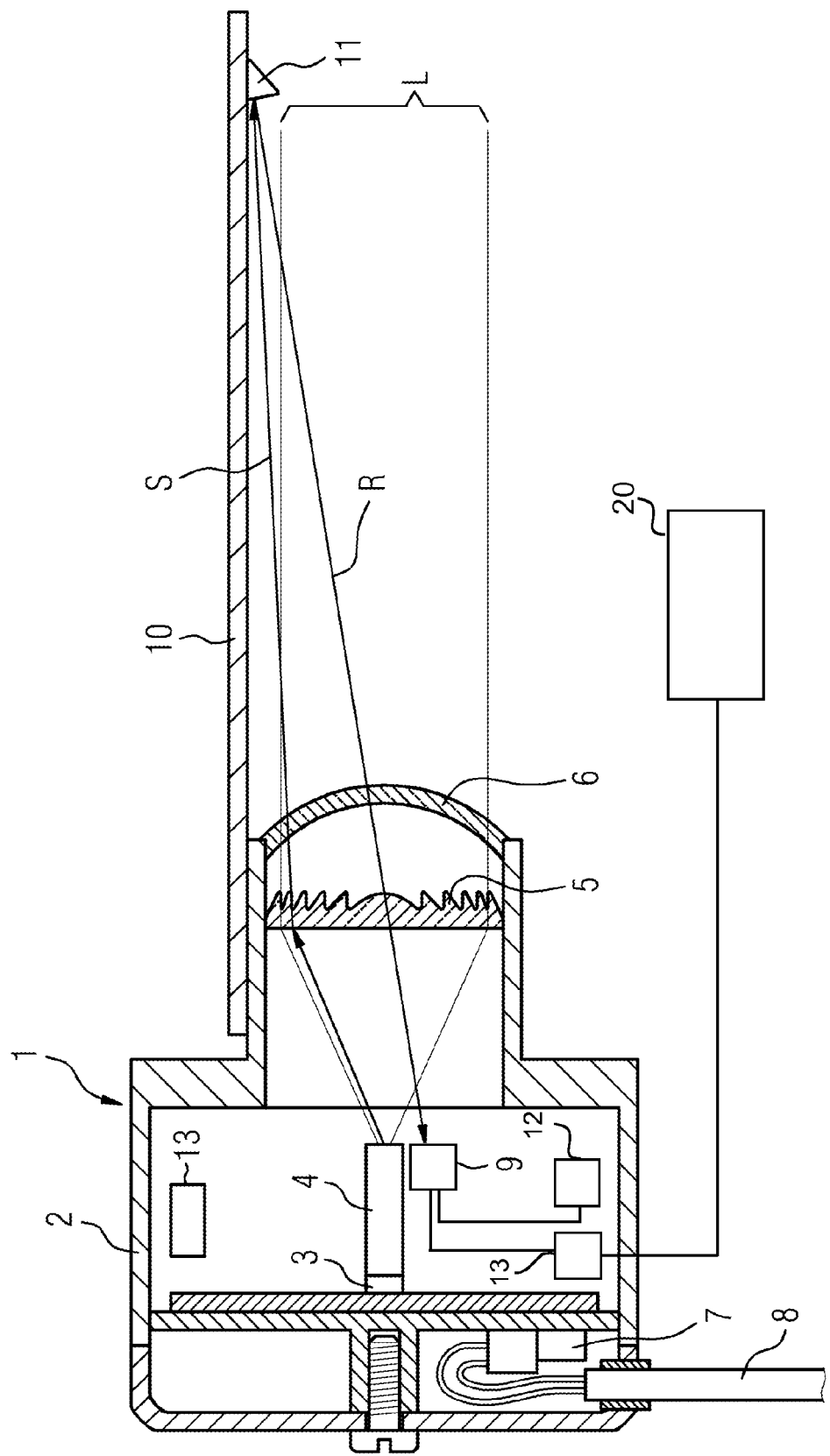

LIGHT SIGNAL DEVICE AND METHOD FOR ASCERTAINING THE DEGREE OF SOILING OF A SHUTTER DISK FOR A SIGNAL GENERATOR

BACKGROUND OF THE INVENTION

Field of the Invention

Light signal devices are used for example in the field of railroad safety engineering for signaling stop and proceed aspects or also in connection with symbol displays. In addition, light signal devices, such as in the form of traffic lights or traffic light systems, are also used for example in the field of road traffic. Corresponding light signal devices usually have signal generators which have a light source and a shutter disk. Here the signal information of the light signal device or of the respective signal generator is contained in the light emerging from the shutter disk. Thus the signal information can consist for example of the information "Signal generator on/off", the color of the signal displayed or the type of symbol illustrated.

Regardless of the type of information displayed, the shutter disks of signal generators must be cleaned regularly because of the soiling which usually occurs during operation, to ensure that the light signal device or the signal information signaled thereby is recognizable. This applies in particular for those light signal devices with which safety-related information is transmitted, as for example in the field of railroad signal or railroad safety engineering. Usually therefore the shutter disk of the signal generator is cleaned regularly, regardless of the actual degree of soiling of the light signal device or of the shutter disk of the signal generator. This can firstly mean that cleaning is performed at a time when it is not in fact yet necessary. Furthermore, the more safety-critical situation can occur in which an unusually heavily soiled shutter disk is not cleaned on a rota basis until a hazard has already arisen because of the degree of soiling and the resulting poor recognizability of the signal information.

The present invention relates to a light signal device having at least one light sensor and one signal generator which has a light source and a shutter disk.

Such a light signal device is known from the published German patent application DE 10 2004 035 438 A1. This describes a light signal system for road traffic, which to ascertain a degree of soiling of a shutter disk in the form of a diffusion disk has a light sensor which is aligned to the diffusion disk. The light sensor here serves to ascertain the degree of soiling of the diffusion disk on the basis of the intensity of the light reflected by the soiled diffusion disk, as a result of which need-based cleaning of the diffusion disk can advantageously be ensured as a function of the degree of soiling ascertained.

BRIEF SUMMARY OF THE INVENTION

The object of the present invention is to specify a light signal device of the aforementioned type, which enables the degree of soiling of the shutter disk of the signal generator to be ascertained particularly reliably and accurately.

This object is inventively achieved by a light signal device with at least one light sensor and one signal generator which has a light source and a shutter disk, at least one reflector element being provided on the inside of a screening stop protecting the shutter disk, through which reflector element some of the light emitted by the light source is reflected in the direction of the at least one light sensor.

The inventive light signal device has a screening stop protecting the shutter disk. Corresponding screening stops, also referred to as hoods, usually protect the shutter disks, i.e. the optical surfaces or luminous fields, of light signal devices or signal systems, in particular against direct sunlight. This should prevent road users or, in the case of a light signal device in the field of railroad traffic, train engineers for example from sometimes incorrectly or belatedly recognizing the signal displayed by the light signal device as a result of direct sunlight, thereby giving rise to an increased risk of an accident.

In the case of the inventive light signal device at least one reflector element is now provided on the inside of a corresponding screening stop, through which reflector element some of the light emitted by the light source of the light signal device is reflected in the direction of the at least one light sensor. This therefore produces a selective reflection of light from the light source such that the reflected light is captured by the at least one light sensor. This advantageously enables, largely independently of the respective ambient conditions, the degree of soiling of the shutter disk of the signal generator to be reliably and at the same time comparatively accurately determined on the basis of the intensity or strength of the light from the light source captured by the at least one light sensor. Advantageously the at least one reflector element is here largely protected against ambient or weathering effects and damage by being attached to the inside of the screening stop.

In principle the at least one light sensor can be disposed at any point on the light signal device. The only prerequisite is that by means of the reflector element some of the light emitted by the light source is reflected in the direction of and thus into the capture range of the at least one light sensor. Thus it is in principle for example conceivable that the at least one light sensor or in the case of a plurality of light sensors at least one of the light sensors is also provided on the inside of the screening stop.

According to a particularly preferred development of the inventive light signal device the at least one light sensor is disposed inside a housing of the signal generator. This has the advantage that the at least one light sensor is maximally protected by the housing of the signal generator against damage and weathering. Furthermore, by disposing the at least one light sensor inside the housing of the signal generator a particularly simple connection between the at least one light sensor and other components of the signal generator or the light signal device, such as a power supply or an evaluation unit for example, is possible.

In connection with the inventive light signal device the light source can be embodied in any manner. This in particular includes the possibility of the light source comprising one or more incandescent lamps.

According to a further particularly preferred embodiment of the inventive light signal device the signal generator is an LED signal generator. This is advantageous because LEDs (Light-Emitting Diodes) in practice have considerable advantages over other illuminants, such as incandescent lamps. This applies in particular in respect of their energy consumption, their longevity and their luminosity, and has meant that LED signal generators, i.e. signal generators in which the light source comprises at least one LED, are increasingly widely used for light signal devices, for example in the field of railroad signal engineering or of road traffic.

Preferably the inventive light signal device can also be configured such that the light signal device is embodied to distinguish between the light from the light source reflected by the at least one reflector element and extraneous light. This is advantageous because as a result it is possible to ascertain the degree of soiling of the shutter disk of the signal generator regardless of the respective ambient conditions, i.e. in particular incident extraneous or ambient light. To this end it is for example conceivable that the light from the light source of the signal generator is distinguished from extraneous light on the basis of its wavelength. In this connection it is possible, for example by means of an optical filter, for only light of a particular wavelength range to be captured by the at least one light sensor and thus to be used to determine the degree of soiling of the shutter disk.

According to a further particularly preferred development the inventive light signal device is formed such that the light source is embodied to modulate the emitted light and the light signal device is embodied such that it distinguishes between the light from the light source reflected by the at least one reflector element and extraneous light on the basis of modulation. This is advantageous because for example light sources in the form of LEDs usually emit already modulated light and the corresponding modulation can be used to distinguish between the reflected light from the light source and extraneous light. On the basis of the modulation it is thus comparatively easy to distinguish between the light from the light source and the extraneous or ambient light, the intensity of which usually fluctuates significantly both over the course of the day and the course of the year.

According to a further particularly preferred embodiment of the inventive light signal device the light signal device has an evaluation unit to determine the degree of soiling of the shutter disk on the basis of the intensity of the light captured by the at least one light sensor. This is advantageous because it enables the light signal device to ascertain the degree of soiling of the shutter disk automatically. The advantage of this is that it is advantageously only necessary to signal a diagnostic message to a higher-level control unit if the evaluation unit establishes a soiling of the shutter disk of the signal generator which makes it necessary to clean the shutter disk before long.

Preferably the inventive light signal device can also be embodied such that the light signal device has a communications interface to transmit measured values of the at least one light sensor and/or information about the degree of soiling of the shutter disk to a control unit. This is advantageous because the control unit, which may for example be a central control unit in the form of a signal box or a component thereof, can be supplied directly or indirectly with information about the degree of soiling of the shutter disk of the signal generator of the relevant light signal device. In this case it is firstly possible for measured values of the at least one light sensor to be transmitted to the control unit and for the evaluation of these measured values and the ascertainment of the degree of soiling of the shutter disk of the signal generator of the light signal device to be performed by the control unit. Secondly, by additionally or alternatively transmitting the information about the degree of soiling of the shutter disk to the control unit, either additional information can advantageously be sent to the control unit or else the volume of data or information to be transmitted to the control unit can be reduced.

According to a further particularly preferred development the inventive light signal device can also be embodied such that the communications interface is embodied as a two-wire interface and the signal generator is embodied to transmit the measured values of the at least one light sensor and/or the information about the degree of soiling of the shutter disk to the control unit by varying a current flowing via the two-wire line. This is advantageous because two-wire lines are in widespread use for connecting signal generators to control units, in particular in the case of signal generators with light sources in the form of incandescent lamps and thus in particular transmission of information about the degree of soiling of the shutter disk of the signal generator is also possible via the two-wire interface for those light signal devices in which signal generators with incandescent lamps are or have been replaced by LED signal generators. Preferably the electrical current flowing via the two-wire line is here varied by the signal generator such that it departs from a usual or valid range of the electrical current. By varying the electrical current flowing via the two-wire line the control unit can advantageously recognize a diagnostic message and thus deduce therefrom the degree of soiling or soiling status of the signal generator or its shutter disk. This has the advantage that need-based maintenance in the form of cleaning the shutter disk of the signal generator is also possible for those light signal devices in which signal generators with incandescent lamps have been replaced by LED signal generators, so that impairments can be reliably prevented, without maintenance work being necessary on a purely precautionary basis, i.e. without any actual need. The transmission of the measured values or of the information about the degree of soiling of the shutter disk can here be effected for example such that when the signal generator is switched on the electrical current flowing via the two-wire line is varied. By for instance generating an erroneous current value when the signal generator is switched on, it becomes possible for the control unit to initially display a fault and to recognize this as a diagnostic message in the form of information about the degree of soiling of the shutter disk. Alternatively or additionally to this, it is for example also conceivable for the electrical current flowing via the two-wire line to be temporarily varied. The electrical current flowing via the two-wire line can for example be varied for a predetermined time and/or a predetermined number of switch-on operations of the LED signal generator. In this case the electrical current flowing via the two-wire line can be varied for example until the next switch-on operation or else during a particular number of switch-on operations. Alternatively or additionally to the aforementioned embodiments it is for example also possible for the electrical current flowing via the two-wire line to be varied in accordance with at least one time/current pattern and as a result for the measured values of the at least one light sensor and/or the information about the degree of soiling of the shutter disk to be transmitted to the control unit.

The invention further relates to a method for ascertaining the degree of soiling of a shutter disk of a signal generator.

In respect of the method the basic object of the present invention is to stipulate a particularly reliable and accurate method for ascertaining the degree of soiling of a shutter disk of a signal generator.

This object is inventively achieved by a method for ascertaining the degree of soiling of a shutter disk of a signal generator, wherein by means of at least one light sensor light emitted by a light source of the signal generator and reflected by at least one reflector element provided on the inside of a screening stop protecting the shutter disk in the direction of the at least one light sensor is captured and on the basis of the intensity of the light captured by the at least one light sensor the degree of soiling of the shutter disk is ascertained.

The advantages of the inventive method correspond to those of the inventive light signal device, so that in this respect reference is made to the corresponding explanations above. The same applies in respect of the preferred developments of the inventive method mentioned below in respect of the corresponding preferred developments of the inventive light signal device, so that in this respect too reference is made to the corresponding explanations above.

Preferably the inventive method can be configured such that the light reflected by the at least one reflector element is captured by means of at least one light sensor disposed inside a housing of the signal generator.

According to a further particularly preferred configuration of the inventive method the degree of soiling of the shutter disk of an LED signal generator is ascertained.

Advantageously the inventive method can also be configured such that the light from the light source reflected by the at least one reflector element is distinguished from extraneous light.

According to a particularly preferred development of the inventive method the light from the light sourced reflected by the at least one reflector element is distinguished from extraneous light on the basis of modulation.

Preferably the inventive method can also be configured such that measured values of the at least one light sensor and/or information about the degree of soiling of the shutter disk can be transmitted to a control unit via a communications interface.

Preferably the inventive method can further also be executed such that the communications interface is embodied as a two-wire interface and the measured values of the at least one light sensor and/or the information about the degree of soiling of the shutter disk are transmitted to the control unit by varying a current flowing via the two-wire line.

BRIEF DESCRIPTION OF THE SINGLE VIEW OF THE DRAWING

In the following the invention is explained in greater detail on the basis of exemplary embodiments. To this end the FIGURE shows, to explain an exemplary embodiment of the inventive method in a diagrammatic sketch, a section of an exemplary embodiment of an inventive light signal device.

DESCRIPTION OF THE INVENTION

The FIGURE shows part of a light signal device 1. In connection with the exemplary embodiments described it may be assumed here that the light signal device 1 is a railroad light signal device, i.e. a light signal device used in railroad safety engineering.

The light signal device 1 has a signal generator 2 with a light source 3. The signal generator 2 is in this case an LED signal generator, to the effect that the light source 3 comprises at least one LED. The light radiated by the light source 3 is fed to an optical system 5 in the form of a Fresnel lens via a fiber-optic conductor 4 and is radiated by the signal generator 2 to the outside via a shutter disk 6 which for example can be embodied as a glass cover. In connection with the illustration in the FIGURE, the radiated light is here characterized by the reference character L.

The signal generator 2 additionally has an electronics system 7 and a connecting cable 8, via which the signal generator 2 is connected to a supply line of the light signal device 1.

To be able to reliably and comparatively very accurately detect the degree of soiling of the shutter disk 6 of the signal generator 2 and thus permit need-based maintenance or cleaning of the shutter disk 6, a light sensor 9 is additionally provided inside a housing of the signal generator 2. This in particular captures light radiated by the light source 3 or the fiber-optic conductor 4, which on emerging from the shutter disk 6 is reflected in the direction of the light sensor 9 by a reflector element 11 which is attached to the inside of a screening stop 10 or hood of the signal generator 2 or the light signal device 1. This is indicated in the FIGURE by an emerging beam of light S which is reflected by the reflector element 11 and returns to the light sensor 9 as a reflected beam of light R.

To prevent possible interference the light signal device 1 or the light sensor 9 or a downstream evaluation unit of the light sensor 9, which for example may be part of the electronics system 7 of the signal generator 2, is designed to distinguish between the light from the light source 3 reflected by the reflector element 11 and extraneous light. This can be done for example such that modulated light is emitted by the light source 3, as is usual with LEDs, and on the basis of the modulation the reflected light from the light source 3 is distinguished from extraneous light.

The ascertainment of the degree of soiling of the shutter disk 6 of the signal generator 2 can firstly be effected by an evaluation unit 12 of the light signal device 1. In this case preferably only information about the degree of soiling of the shutter disk 6 is transmitted via a communications interface 13 of the light signal device 1 to a control unit 20 which for example may be embodied as a component of a signal box. This may for example happen such that a diagnostic message is transmitted to the control unit 20 only if the shutter disk 6 needs to be cleaned in the foreseeable future. Secondly it is for example alternatively also possible for measured values of the light sensor 9 to be transmitted to the control unit 20 by the light signal device 1 via the communications interface 13 and for said control unit 20 itself to subsequently ascertain the degree of soiling of the shutter disk 6 from the measured values received.

Regardless of which component effects the corresponding evaluation, the intensity or strength of the light from the light source 3 captured by the sensor device 9, which in particular stems from the reflector element 11 and has thus penetrated the shutter disk 6 twice, represents a measure for the degree of soiling of the shutter disk 6.

It can be pointed out that a plurality of reflector elements 11 can also be provided on the inside of the screening stop 10. Additionally, with redundancy in mind it is for example also possible for a plurality of light sensors 9 to be provided. These could in principle also be disposed outside the housing of the signal generator 2, i.e. for example likewise be attached to the inside of the screening stop 10. As regards protecting the light sensor 9 or the light sensors against ambient effects and effecting a simplified connection to other components of the signal generator 2 an arrangement of the at least one light sensor 9 in the housing of the signal generator 2 is however advantageous.

In particular in the case of a signal generator with a light source in the form of an incandescent lamp or else in particular an LED signal generator which has replaced a corresponding optical signal generator in a light signal device 1, it may happen in practice that the light signal device 1 or the signal generator 2 is connected to the control unit via a two-wire interface. This two-wire interface, which acts as the power supply for the signal generator 2, can in this case advantageously be used as a communications interface such that the measured values of the at least one light sensor 9 and/or the information about the degree of soiling of the shutter disk 6 are transmitted to the control unit by varying a current flowing via the two-wire line. This is in particular advantageous to the effect that it is possible to dispense with an additional communications interface merely for transmitting a diagnostic message in the form of the measured values of the at least one light sensor 9 or the information about the degree of soiling of the shutter disk 6 to the control unit.

According to the above explanations in conjunction with the described exemplary embodiments the inventive light signal device and the inventive method in particular have the advantage that by means of the at least one reflector element 11 it is possible to selectively and significantly increase the volume of the light from the light source 3 captured by the light sensor 9 which has penetrated the shutter disk 6. As a result, the reliability and accuracy with which the degree of soiling of the shutter disk 6 are ascertained is advantageously increased, which ultimately results in an increase in operating safety and in a reduction in operating costs, so that the shutter disk 6 has to be cleaned only if this is actually required in individual cases.

The invention claimed is:

1. A light signal device, comprising:
    at least one light sensor;
    a signal generator having a light source and a shutter disk;
    a screening stop protecting said shutter disk and having an inner surface;
    at least one reflector element disposed on said inner surface of said screening stop, said at least one reflector element reflecting some light emitted by said light source in direction of said at least one light sensor; and
    an evaluation unit configured to determine a degree of soiling of said shutter disk on a basis of an intensity of the light captured by said at least one light sensor.

2. The light signal device according to claim 1, wherein said signal generator has a housing, and said at least one light sensor is disposed inside said housing.

3. The light signal device according to claim 1, wherein said signal generator is an LED signal generator.

4. The light signal device according to claim 1, wherein the light signal device is configured to distinguish between the light from said light source reflected by said at least one reflector element and extraneous light.

5. The light signal device according to claim 1, wherein/ which further comprises:
    said light source is configured to modulate the light emitted by said light source; and
    the light signal device is configured to distinguish between the light from said light source reflected by said at least one reflector element and extraneous light, on the basis of the modulation.

6. The light signal device according to claim 1, which further comprises a communications interface configured to transmit at least one of measured values of said at least one light sensor or information about a degree of soiling of said shutter disk, to a control unit.

7. The light signal device according to claim 6, wherein said communications interface is embodied as a two-wire interface and said signal generator is configured to transmit at least one of the measured values of said at least one light sensor or the information about the degree of soiling of said shutter disk to said control unit by varying a current flowing over said two-wire interface.

8. A method for ascertaining a degree of soiling of a shutter disk of a signal generator, the method comprising the following steps:
    protecting the shutter disk by a screening stop;
    providing at least one reflector element inside the screening stop;
    emitting light from a light source of the signal generator;
    reflecting the light emitted by the light source from the at least one reflector element in direction of the at least one light sensor;
    capturing the reflected light using the at least one light sensor; and
    ascertaining a degree of soiling of the shutter disk on a basis of an intensity of the light captured by the at least one light sensor.

9. The method according to claim 8, which further comprises placing the at least one light sensor inside a housing of the signal generator.

10. The method according to claim 8, wherein the signal generator is an LED signal generator.

11. The method according to claim 8, which further comprises distinguishing the light emitted from the light source and reflected by the at least one reflector element, from extraneous light.

12. The method according to claim 8, which further comprises distinguishing the light emitted from the light source and reflected by the at least one reflector element, from extraneous light on a basis of modulation.

13. The method according to claim 8, which further comprises transmitting at least one of measured values of the at least one light sensor or information about a degree of soiling of the shutter disk, over a communications interface to a control unit.

14. The method according to claim 13, which further comprises:
    using a two-wire interface as the communications interface; and
    transmitting at least one of the measured values of the at least one light sensor or the information about the degree of soiling of the shutter disk to the control unit by varying a current flowing over the two-wire interface.

* * * * *